(12) United States Patent
Lake (10) Patent No.: US 6,814,387 B2
(45) Date of Patent: Nov. 9, 2004

(54) LOAD BED LIFT-ROOF COVER (75) Inventor: William Henry Russell Lake, Lathrup Village, MI (US)

(73) Assignee: Trail-R-Van Inc., Lathrup Village, MI (US)

(*) Notice: Subject to any disclaimer, the term of this patent is extended or adjusted under 35 U.S.C. 154(b) by 0 days.

(21) Appl. No.: 10/360,402

(22) Filed: Feb. 6, 2003

(65) Prior Publication Data

US 2004/0155484 A1 Aug. 12, 2004

Related U.S. Application Data (63) Continuation-in-part of application No. 07/216,140, filed on Jul. 7, 1988, now abandoned, which is a continuation-in-part of application No. 07/052,906, filed on May 22, 1987, now Pat. No. 4,756,571.

(51) Int. Cl.[7] .................................................. B60P 7/02
(52) U.S. Cl. ................................. 296/100.06; 296/165
(58) Field of Search ......................... 296/26.06, 100.06, 296/156, 165, 176

(56) References Cited

U.S. PATENT DOCUMENTS 5,102,185 A * 4/1992 Lake ........................ 296/165
6,543,834 B2 * 4/2003 Sisson ..................... 296/100.1

FOREIGN PATENT DOCUMENTS

FR          1518731     * 3/1969    .............. 296/26.06

* cited by examiner

Primary Examiner—Dennis H. Pedder (57) ABSTRACT

An attaching system for a lift-roof cover pivoting substantially about a fixed forward wall upper edge via application of rear hatch technology of the prior art for conventional cab high covers together with attachment means in the form of linkages. The attaching system for mounting to a load bed supports multiple functions providing convenience in distribution and installation processes; in particular facilitating unmodified use of processes employed for conventional caps with respect to shipping and storage. The system includes unique draw latches incorporating alternate methods for adding reliable function supporting levels of operating convenience demanded for lift-roof applications. Simplified manufacturing adaptation of a conventional cap is supported by pre-assembly of key subassemblies. Capability for completing all functional adjustments before shipping supports installation simplified to levels suited to needs of multiple location installers experienced only with conventional covers of the prior art.

1 Claim, 9 Drawing Sheets

LOAD BED LIFT-ROOF COVER

CROSS-REFERENCES TO RELATED APPLICATIONS

This invention defines improvements to the concepts described under U.S. Pat. No. 5,102,185 which is a continuation-in-part of Ser. No. 07/216,140, Jul. 7, 1988, abandoned, which is a continuation-in-part of Ser. No. 07/052,906, May 22, 1987, U.S. Pat. No. 4,756,571.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION (1) Technical Field

The invention pertains to lift-roof covers for use with load beds of light trucks, providing improved access to the load bed and extending functions to other uses, with major focus upon achieving these benefits in a manner best accommodating manufacturing and distribution processes broadly in use relative to conventional fixed mount cab high covers (caps) of the prior art. Applicable US classifications include 296/100.1, 100.6 hinged load covers, 296/165 expansible or collapsible vehicle body, 296/176 expansible/collapsible from a first to a second configuration for camping. The disclosure describes key improvements beyond the concept described by U.S. Pat. No. 5,102,185, these improvements providing simplification in manufacturing processes and improvements in convenience of installation and operation to levels approaching those for conventional fixed mount caps (cab high covers) of the prior art. These improvements also increase the functional reliability of the complete lift-roof cover system and make possible enhanced aesthetic appeal by eliminating obvious appearance differences from conventional fixed mount caps of the prior art which have demonstrated highest user acceptance levels. In particular, objection has been made to separation lines between the forward wall and the lift-roof/cap shell when these are visible in side view. The application to a new use of existing technology for hinging and weather sealing rear hatch assemblies for fixed mount caps of the prior art overcomes this deficiency, while supporting functional and economic benefits associated with use of technology which is familiar to practitioners of the art to which the invention pertains.

(2) Description of Related Art

Through review of the prior art defined in patents relating to pickup truck load bed covers issued subsequent to Lake, U.S. Pat. No. 5,102,185, it can be seen that much effort has been focused on inventing alternate means to provide improved access for loading/unloading and facilitating adaptation to uses beyond cargo protection while also making available a roof height equal to or greater than that of the vehicle cab. Examples include the following:

Ekonen et al, U.S. Pat. No. 5,104,175, and Hemdon, U.S. Pat. No. 5,951,095, describe transformable cover assemblies which unfold from a low profile on the load bed to provide full enclosure with a roof level equivalent to that of a cab high, fixed mount cap of the prior art. However, they add complexity while giving up significant degrees of security and integrity of appearance with the vehicle when in the cab high operating mode.

Plamondon, U.S. Pat. No. 6,149,217, Alexa, U.S. Pat. No. 6,000,745, Moberly, U.S. Pat. No. 5,443,295, and Hanning, U.S. Pat. No. 6,471,282, describe retractible flexible covers of cab height which fail to provide the security and integrated (with vehicle) appearance provided by most fixed mount, molded caps.

Aragon et al, U.S. Pat. No. 5,516,182, Herzberg et al, U.S. Pat. No. 5,203,603, and Hutchinson, U.S. Pat. No. 5,655,809, describe telescoping cab high covers having rigid outer paneling. These concepts provide better cargo security, but add significant complexity and also fail to provide the fully integrated appearance provided by most conventional, fixed mount, molded caps.

Fowler, U.S. Pat. No. 6,471,280, describes a cover with hard molded shell but, in order to provide improved loading access, requires removal of the shell, an obvious inconvenience.

Baldwin, U.S. Pat. No. 6,439,647, Dence, U.S. Pat. No. 6,394,532, and Lambden, U.S. Pat. No. 6,007,137, describe cab high rigid covers pivoting from one or both sides in a manner providing increased interior volume as desirable for adaptation to camping or improved side loading access. However they fail to provide improved access from the rear suitable for loading popular wheeled equipment.

Harkins, U.S. Pat. No. 5,209,543, describes an apparatus for enclosures such as pickup bed tops, including a pair of folding top panels longitudinally hinged for closing along the top centerline. In order to achieve the benefits of lift-roof improved access loading from the rear, considerable and costly complexity is added.

Medlin, U.S. Pat. No. 5,595,418, and Enninga, U.S. Pat. No. 5,104,175, describe means for mounting a cap to a load bed in ways accommodating pivotal rotation of the complete camper shell about a forward axis by lifting from the rear. However, significant complexity appears to be added in hardware and processes necessary for installation and acceptable function. Furthermore, sealing at the forward wall to load bed interface is not addressed.

Moore et al., U.S. Pat. No. 5,421,833, describes a camper shell intended for mounting directly to a truck frame on a vehicle assembly line, adaptable to having its roof pivotally raised from the rear and having flexible walls for camping attached and/or removed. Moore et al appears focused on application of lift-roof functional benefits via a high production volume vehicle assembly process requiring high levels of manufacturing tooling investment and does not appear to address needs of manufacturing and distribution systems in place within the conventional cap industry.

The concepts cited above provide various benefits beyond those provided by conventional fixed mount caps of the prior art. In most cases compromises are introduced which are evidently unacceptable to most purchasers of fixed mount, molded caps (historically comprising the primary market for pickup truck covers), who demand an appearance well integrated with styling of the vehicle, together with secure, weatherproof enclosure of the load bed to a height matching that of the vehicle cab. It would appear that Enninga and Medlin are able to retain all key functional and aesthetic benefits provided by conventional caps as long as they are used in the closed condition. When in the open condition cargo space is compromised, due to intrusion of the cap forward wall, which moves rearward as the cap shell is raised and introduces issues with respect to sealing to the load bed forward wall. Also, complexity introduced in the components and associated processes necessary for installation become of particular concern where installation may be completed at multiple locations by individuals with limited experience relative to the product. Therefore, objects of my invention include to provide the benefits of improved access for loading and easy adaptation to alternate uses while minimizing complexity in the installation process and/or costs in added hardware and avoiding compromises relative to benefits already provided by conventional fixed caps of the prior art.

Grise, U.S. Pat. No. 4,452,482, and McGaughey et al, U.S. Pat. No. 4,461,185, describe hatch frame construction for pickup truck caps including an integral hinge for supporting a hatch door in a weatherproof manner with location close to the cap roof edge. These patents are of referent interest in describing adaptation of radius door technology to lift-roof cover application Ely et al, U.S. Pat. No. 6,179,350, describes a draw latch and various means for providing resistance to keep the members of a latch assembly in a variety of given positions and addresses need for manually raising a catch in order to effect disengagement.

Gromotka, U.S. Pat. No. 5,478,125, describes a draw latch in which rotation of the lever initially disengages the catch and positive contact between the lever and latch arm at a distance from the latch pivot causes the hook arm to kick out. Objects include to provide these functions with parts which are few, durable and reliable in all functions.

P. R. Gley et al, U.S. Pat. No. 3,519,298, describes a positive lock for toggle catch, or draw latch, permitting concomitant release of the catch and movement of the handle to an open position.

The above draw latch patents address need for one-handed convenience in operation. Various methods are described as used in the prior art for positioning handles and latch arms to support convenient operation. Plastic inserts have been employed where corrosion from exposure to the elements could otherwise impair function. Metal-to-metal frictional methods are commonly employed in order to support low cost. However, it would appear that, in practice, most friction or interference methods tend to result in high efforts and/or variation in effort due to wear and/or manufacturing variability. Such methods may be adequate to temporarily retain latch handles to an open position, because full hand strength may be conveniently applied to effect release. However, the control effort with respect to a latch arm pivoting from a latch handle needs to be relatively low in order to support convenient operation, which requires moving the latch arm independently of the handle either immediately before moving the handle, or simultaneously with handle operation, but in any case as a fluid one-handed movement. Accordingly it is an object to provide a draw latch which supports convenient positioning of component parts in operation by applying reliable methods to draw latches having other characteristics suited to lift-roof cover application. This may be best achieved with concepts depending on zero resistance beyond that of a free pivot and force of gravity, or otherwise with a more reliable method of providing frictional resistance than generally employed in the prior art.

SUMMARY OF THE INVENTION

To meet expectations with respect to product attributes broadly demanded within the primary market containing the majority of potential lift-roof cover users, these attributes must not be significantly compromised. Of particular importance for meeting needs of customers through the total delivery chain are convenience in manufacturing, distribution and installation as well as in end use. Accordingly, objects include to provide a forward wall and attaching system which may be conveniently pre-assembled and stored ready for assembly with minimal rework to a molded reinforced plastic cover of the prior art (generally limited to removal of material as needed to attach added hardware), together with an attaching system simplifying the process of installation to a vehicle load bed while supporting shipping, handling, storage methods employed for conventional caps of the prior art. Subassemblies incorporating draw latches and lift assist struts (plus rigid support struts and rigid support strut engagement means) are also used supporting these objectives. Draw latches have been uniquely developed for lift-roof application to provide reliable operating convenience.

To satisfy users, opening and closing operations must be conveniently completed by one person. Available draw latches of the prior art have been found lacking in functions necessary for such convenience. Latches on each side of the cover need to be simultaneously operated with simple movement of one hand, both in closing/latching and releasing/raising the cover. This requires reliable friction means and operating geometry ensuring that, when the lift-roof cover has been lowered on the load bed and the latch handle is operated to effect engagement, the engaging latch arm can be conveniently positioned to complete engagement and, after operation to effect release, remain in a position allowing unimpeded lift-roof raising or lowering.

A preferred forward wall is adapted from technology applied to rear hatch doors for conventional fixed caps of the prior art, generally referred to as radius doors in the trade to which the invention pertains. Adaptation of extruded-frame-hinge-within-extruded-frame pivotal attachment allows the forward wall to lift-roof structure interface joint to be inboard of the lift-roof side walls and hidden as viewed from outside of the vehicle, a valuable aesthetic benefit. Related benefits of applying this proven technology to a new use include simplified systems for lift-roof to forward wall hinging/sealing and orientation/position adjustment of the forward wall relative to load bed.

A novel forward wall to load bed attaching system is in the form of a linkage which supports multiple functions, including providing (a) means for adjusting location of the forward wall on the load bed and orientation of the forward wall to achieve effective sealing in closed condition between forward wall, lift-roof and load bed; (b) means of conveniently completing installation or removal from the vehicle load bed without fully removing attaching fasteners (c) in conjunction with lift assist struts, means to hold the forward wall to a closed position relative to the lift-roof with all components secured above a plane across lower edges of the molded lift-roof, so that the complete lift-roof cover may be shipped, handled and stored prior to installation using the same methods employed for a conventional fixed mount cap of the prior art.

In use, the lift assist struts are mounted between the load bed and lift-roof structure in a manner (a) facilitating sealing at the forward wall to lift-roof interface by loading the lift-roof forward against the forward wall and (b) adding lateral constraint in location of the lift-roof relative to load bed, providing protection from damage which might otherwise result, for example, from severe wind gusting immediately on raising the lift-roof.

A durability concern for conventional caps of the prior art has related to effects of severe shake, as associated with some modes of heavy duty model pickup operation on rough road surfaces. Without countermeasures, lift-roof structure side wall forward lower edges have increased sensitivity to lateral vibration compared with a conventional cap, in which the side walls are integral with the forward wall. Such vibration is prevented by incorporation of side wall retainer means between the lift-roof structure and the forward wall structure. To accommodate dimensional variability, these units incorporate means for adjustment of relative lateral position.

The use of frame-hinged-within-frame radius door fabrication technology in a forward wall to lift-roof attachment system results in forward loads imposed by the lift assist struts being transferred to the forward wall by the hinge interface when the lift-roof is in a raised position. Rigidity of the hinge interface protects the seal from excessive compression in upper locations, so that with the lift-roof dosed and without countermeasures, forward loading is transferred primarily to the lower edges of the inverted U shaped lift-roof side wall to forward wall interface. This results in the seal and inner and outer frames deforming toward the lower edges to a degree eventually impairing both sealing and positioning of the lift-roof on the load bed. To avoid these conditions and provide precise control of closed location of the lift-roof relative to the forward wall, means of adjustable forward wall closure stop are needed. This is achieved cost effectively by integrating such means of adjustable stop with the adjustable lift-roof side wall retainers at each side of the lift-roof cover. These integrated units allow closure position to be set simultaneously with side wall retainer engagement during assembly, protecting sealing function between the lift-roof and the forward wall and preventing vibration of lift-roof side walls relative to the forward wall, as well as increasing security from unauthorized forced entry.

Designing for flex under severe operating conditions has become broadly recognized as necessary for structures such as tall buildings and bridges in order to achieve reliability with acceptable cost. This concept may have been less broadly recognized in automotive accessory applications and, perhaps as a result, fracturing of early molded cap shells was not uncommon, particularly in cold climates. Therefore, manufacturers have developed caps which better absorb flex. Severe operation results in significant torsional flexing of most pickup truck frames, much of which is transmitted to the load bed. If ignored, the effects add cost in reliability and other functional respects. Flex may be less of a concern with low frequency twist, as induced by normal off-road operation. However, pickups, particularly heavy duty models, may induce severe lateral shake due to high rate suspension systems which, under some light load operating modes on rough road surfaces, instead of fully absorbing irregularities, cause high frequency shake to be transmitted to the load box. Accordingly, it is an object of the invention to address issues of structural flex under operating conditions in lift-roof cover application.

In summary, the object of my invention is to add novel improvements with respect to convenience, cost and reliability affecting assembly, distribution, installation and use while providing a combination of advantages relative to fixed mount covers of the prior art as described in the parent U.S. Pat. No. 5,102,185 and fully maintaining the benefits already provided by conventional bed covers of the prior art. Further objects and advantages will become readily apparent to those skilled in the art to which the invention pertain upon reference to the following detailed description of a preferred embodiment.

DESCRIPTION OF THE DRAWINGS

The description refers to the accompanying drawings in which like reference characters refer to like parts throughout the several views. Much of what is described in the disclosure refers to one side of a lift-roof cover. The other side may be assumed to be of like or mirror image form.

DETAILED DESCRIPTION OF THE PREFERRED EMBODIMENTS

Figure 1:
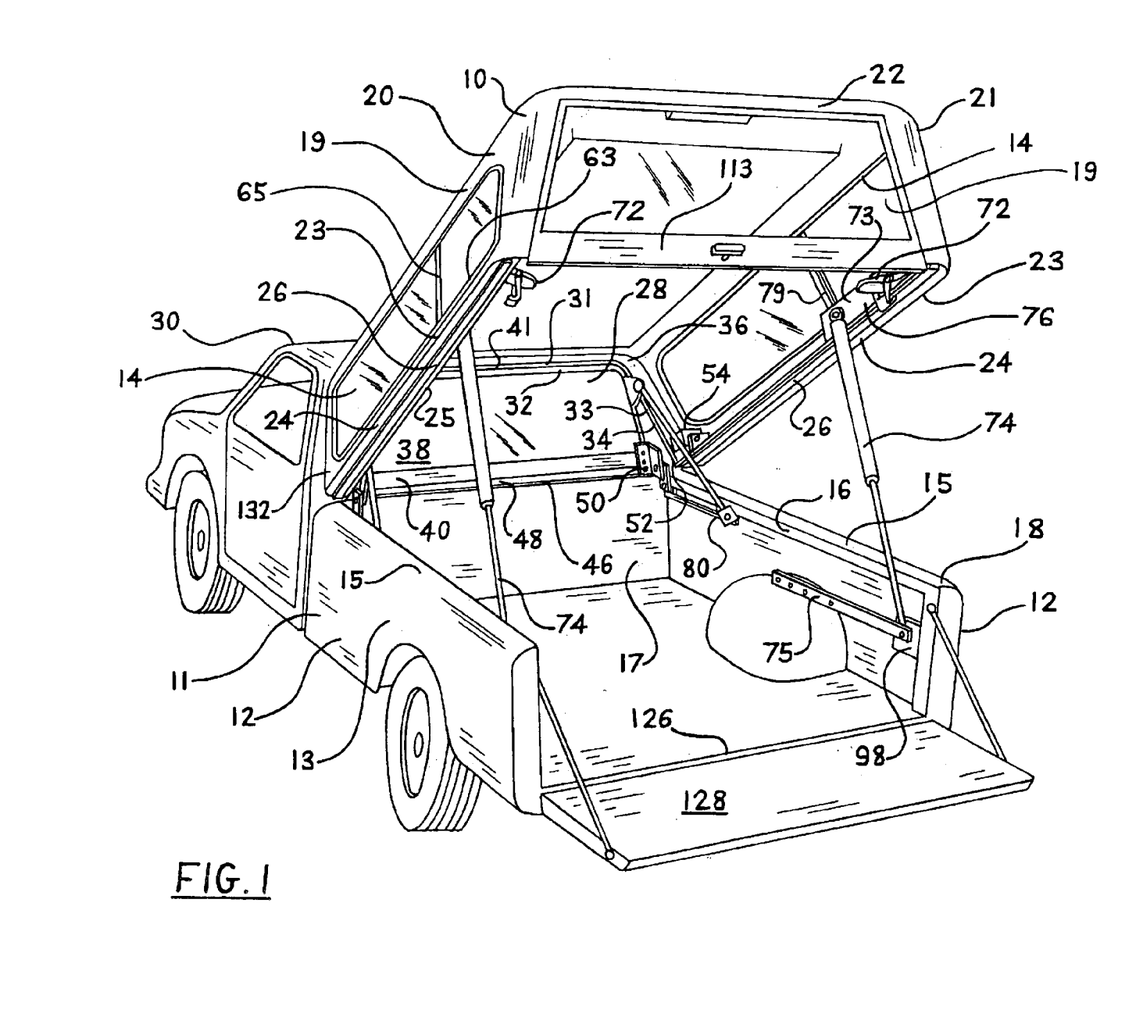
FIG. 1 is a perspective view looking forward of an improved lift-roof cover installed on a light truck load bed with the lift-roof structure (cap shell) in a raised condition.

Referring to FIG. 1: The lift-roof cover 10 is mounted on a load bed 11 including side walls 12 fabricated so that the outside vertical surface 13 of the load bed wall 12 is continuous with the upper, substantially horizontal surface 15 of the wall 12 and the surface 15 likewise is continuous with an inside vertical flange 16 formed approximately at 90 degrees where it joins the upper surface 15, the flange 16 serving to add rigidity to the upper surface 15, as needed under vertical loading, and extending downward typically one to two inches. The flange 16 is fully accessible along most of the length of the load bed 11 between the load bed forward wall 17 and rear end 18. Side walls 19 at left and right sides 20, 21 respectively of a lift-roof structure 22 incorporate windows 14 and are joined at their lower edges 23 to substantially horizontal structural rails 24 which terminate along their length at an inner edge 25 almost directly above the load bed flanges 16. The rails 24 and side wall lower edges 23 match contours of the upper surfaces 15 of the load bed side walls 12. Sealing means 26 are mounted along the lower surface of the lift-roof cover rails 24 to provide weather sealing between the load bed upper surfaces 15 and lift-roof structure 22 when closed.

Figure 2:
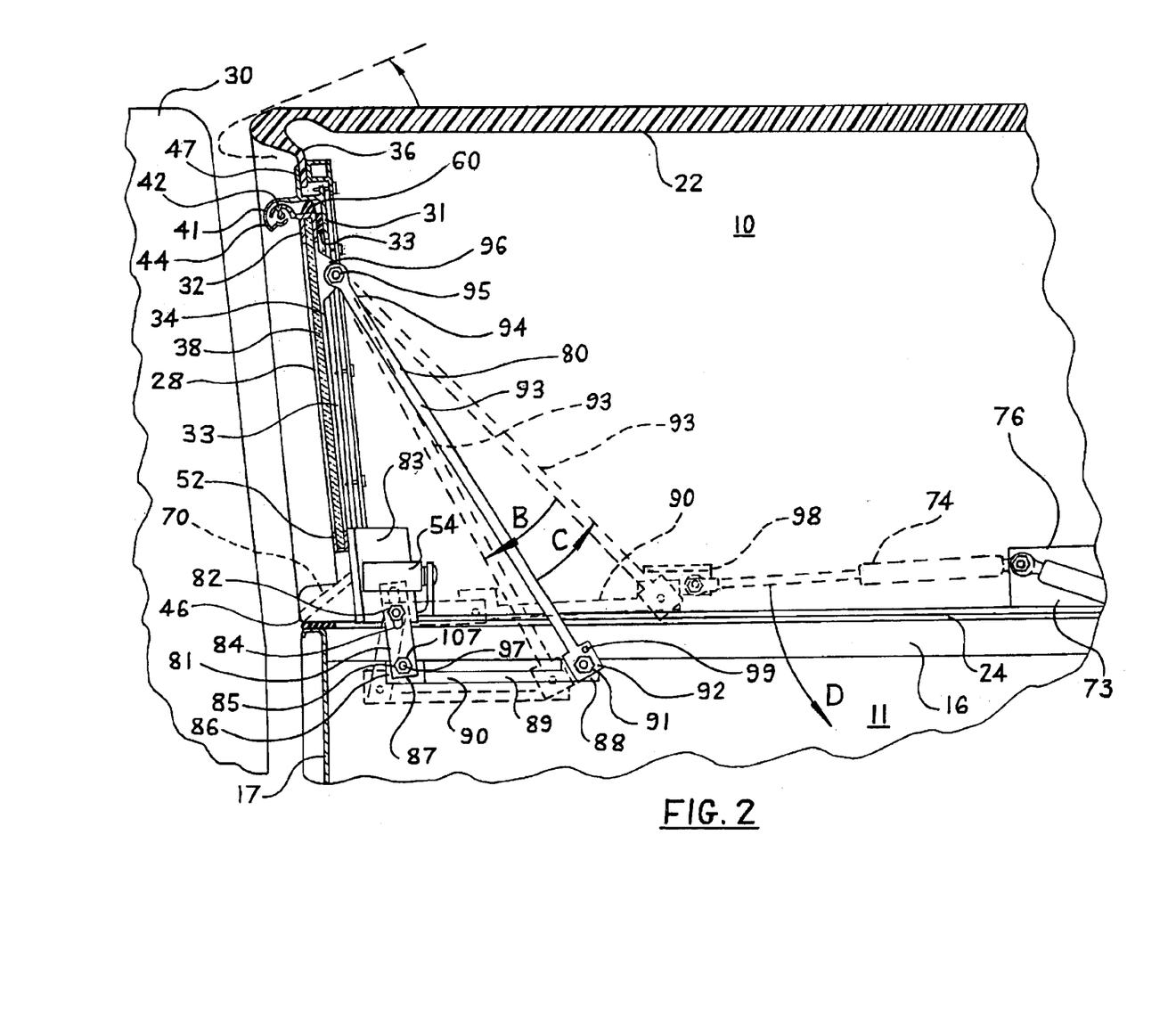
FIG. 2 is a fragmentary sectional view from inside an installed lift-roof cover, looking toward its right side, showing a preferred forward wall attaching and adjusting means in form of linkages for attaching a lift-roof cover to a light truck load bed. The position of components with the lift-roof cover installed for use is shown in solid line and other positions are shown in broken line.
Figure 4:
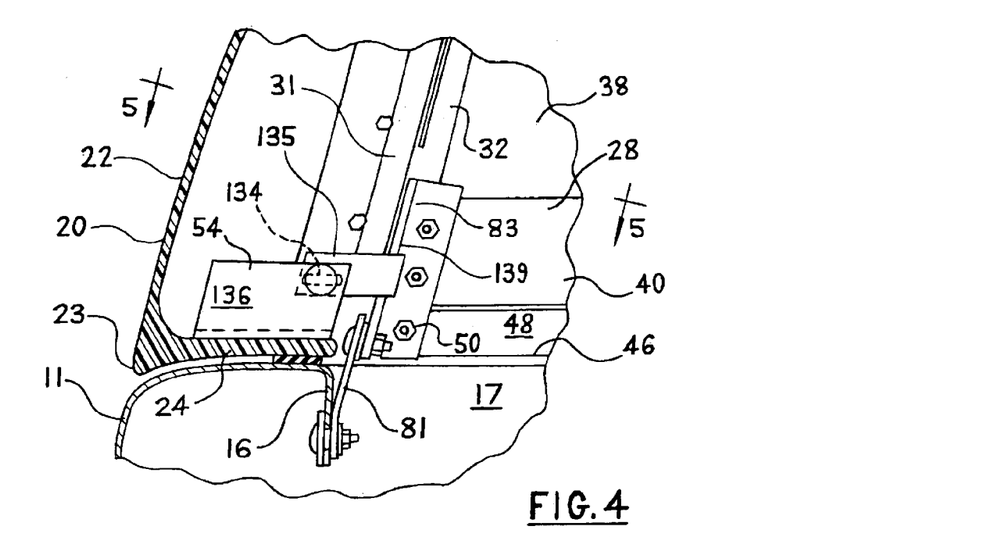
FIG. 4 is a fragmentary sectional view looking forward along arrows 4—4 of FIG. 5, showing a lift-roof to forward wall adjustable side retention/stop means.
Figure 5:
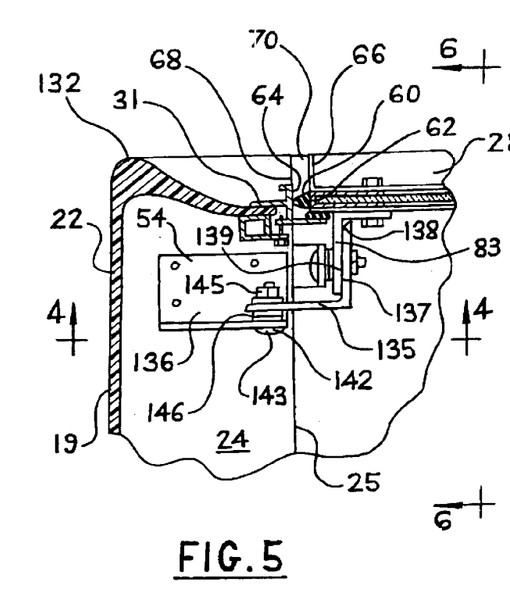
FIG. 5 is fragmentary sectional view downward along arrows 5—5 of FIG. 4, showing forward wall sealing means and also a lift-roof to forward wall adjustable side retention/stop means.
Figure 6:
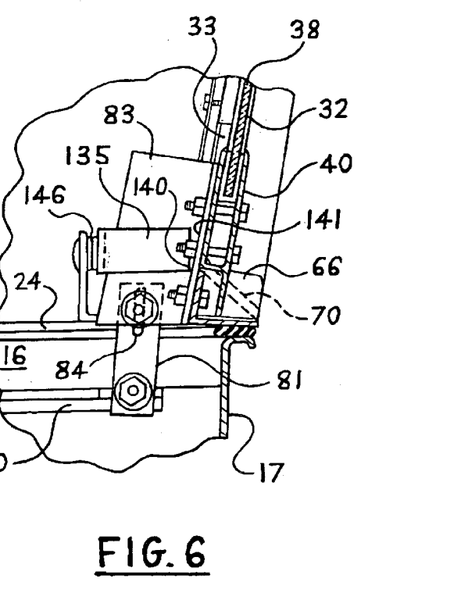
FIG. 6 is a fragmentary sectional view along arrows 6—6 of FIG. 5.

Referring to FIGS. 1, 2 and 4: In a preferred embodiment the lift-roof structure 22 is pivotally attached to a forward wall structure 28 extending upward from the load bed wall 17 behind the cab 30, by means of an inverted U shape outer frame 31 hinged to an inner frame 32 of matching shape with sealing means 33 at side interfaces 34 between the outer and inner frames 31, 32. The outer frame 31 is attached to a forward opening surround 36 in the lift-roof structure 22 and the inner frame 32 contains glass 38 retained by a horizontal closure member 40. The outer and inner frames 31, 32 are attached to each other at an upper lateral hinge interface 41 by telescopically assembled interlocking extruded male and female hinge halves 42, 44, respectively, of a sectional form similar to those illustrated by McGaughey et al, U.S. Pat. No. 4,496,185 (FIG. 1a) and Grise, U.S. Pat. No. 4,452,482 (FIG. 2).

Vertical adjustability of the forward wall 28 relative to lift-roof 22 is needed to ensure correct relationship of the forward wall lower edge 46 relative to side wall rails 24 and the interfacing load bed 11, in closed condition. This adjustment may be made when the forward wall 28 is first installed to the lift roof structure 22 during the assembly process by control of a range of overlap 47 between the lift-roof 22 and the outer frame 31 to which the lift-roof 22 is attached. If adjustment is later needed relative to a load bed 11 with which the lift-roof cover 10 is to be used, increased convenience is desirable. Therefore, in a preferred embodiment, the forward wall 28 may include a lower member 48 adjustably attached via accessible attachment means 50. Relative rigidity of the hinge interface 41 protects the upper seal interfaces from excessive compression. However, in a closed condition forward loading is transferred disproportionately toward the lower edge 52 of the seal interface 34 by the lift-roof side walls 19. This results in a tendency for the sealing means 33 and interfacing radius door frames 31, 32 to be distorted toward the lower edge 52, eventually impairing both sealing and positioning of the lift-roof 22 on the load bed 11. To prevent these conditions and provide improved control of closed location of the lift-roof 22 on the load bed 11 and relative to the forward wall 28, forward wall to lift-roof structure adjustable stop and side retainer means 54 are employed at each side.

Referring to FIGS. 1, 2, 5 and 6: Reliable weather sealing between the forward wall 28 and lift-roof structure 22 below the hinge interface 41 is achieved on each side of the forward wall 28 with auxiliary sealing means 60 mounted to the inner frame outer surface 62 and seating against the facing inner surface 64 of outer frame 31. At lower levels substantially vertical surface continuation 66 below the inner frame outer surface 62 faces a matching surface continuation 68 below and preferably coplanar with the outer frame surface 64 and inside edge 25 of rail 24, so that seal 70 mounted to said lower surface continuation 66 seats against the matching outer surface continuation 68 when the lift-roof 22 is closed. The lower seal 70 extends forward from below the auxiliary seal 60, so that rain water running down the forward edge of seal 60 drops onto seal 70 and is carried over the load bed forward wall 17.

Figure 3:
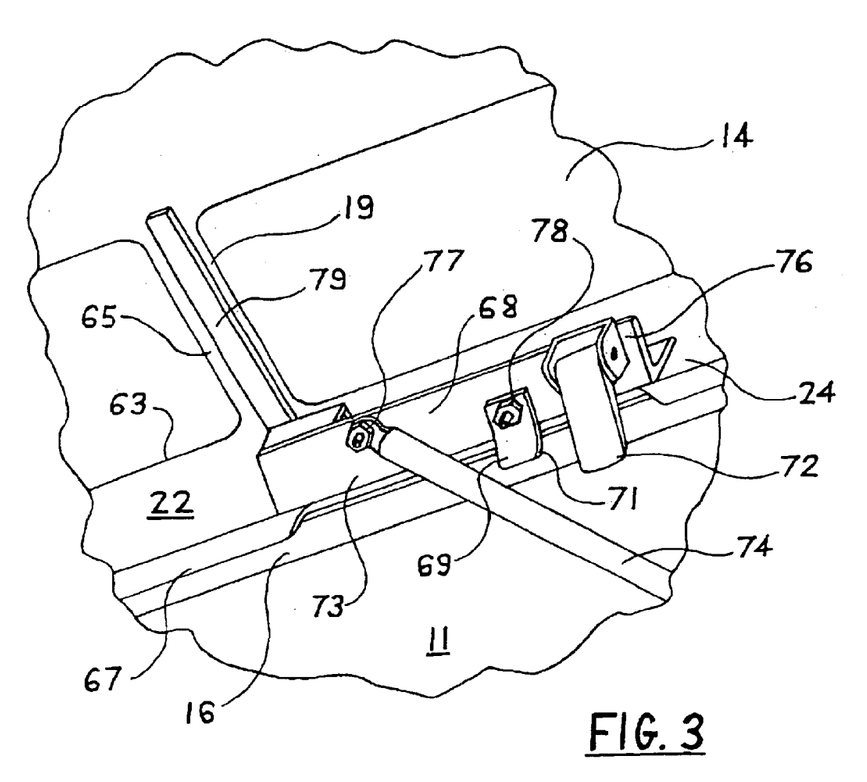
FIG. 3 is a fragmentary perspective view of a latch and strut pivot mount assembly as installed to the right side rail of a lift-roof structure in closed condition.

Referring to FIG. 1 and FIG. 3: Further improvement results from the use of draw latches 72 uniquely developed for convenience in operation of the lift-roof cover 20. Improved draw latches 72 are mounted to latch and strut pivot mount brackets 73 attached to each lift-roof rail 24 to form a part of the lift-roof structure 22. In the manufacturing process, the draw latches 72 and lift assist struts 74 together with rigid struts 75 are pre-assembled to the brackets 73 to form latch and strut pivot mount subassemblies 76, which are then held for installation to the lift-roof structure 22, thus simplifying the final assembly process. Lifting force exerted by the lift strut 74 tends to distort the lower edge 23 of the side wall 19. Because such force is absent in a conventional fixed cover installation to a load bed, stiffness is typically insufficient to avoid visible distortion in a lift-roof adaptation, particularly under reflected light conditions. Visible distortion can be eliminated by increasing bending and torsional stiffness along the side wall structural rail 24. However, a less costly method in adapting a cover of the prior art to lift-roof function without degrading appearance has been found to be by transferring strut lift force to an upper area of the side wall 19 as a side force. Accordingly, latch and strut pivot mount bracket 73 incorporates side wall structural reinforcing means 79 projecting upward from a level close to the lower edge 63 of the window 14 against the lift-roof side wall 19 and hidden from external view behind window frame structure 65 typically present in a conventional cab high cover of the prior art.

Some caps of the prior art are molded with an inside downward oriented lip 67, so that the lip 67 overlaps the flange 16, thereby providing control of lateral location when sitting on a load bed 11. In a lift-cap application such a lip is removed in locations adjacent to components where interference may otherwise result, as at forward wall attaching linkages 80 and latches 72. For lift-roof adaptation of molded caps not having such a lip, brackets 73 mounted to the rails 24, each with an inboard surface 68 substantially coplanar with the load bed flange 16 provide a convenient option of adding a lateral locating means 69, optionally attached by rigid strut attachment means 78, the locating means 69 having a ramped leading edge 71 suitable for providing precise lateral location on the load bed 11 when the lift-roof 22 is closed.

Referring to FIG. 1 and FIG. 2: A preferred forward wall to load bed attaching system is in the form of a linkage 80 at both sides 19 of the lift-roof cover 10, incorporating pivot links 81, attached via fastening means 82 to a lower part 83 attached to, or forming part of, the forward wall 28 at a pivot link upper slotted end 84, and via fastening means 85 to a load bed inner flange forward attaching clamp means 86 at the pivot link lower end 87.

In a preferred embodiment the load bed forward attaching clamp means 86 is rigidly attached to a rearward attaching clamp means 88 via a bar 89, so forming a clamp link 90. Said rearward clamp means 88 is attached via fastening means 91 to a lower end 92 of a forward wall orientation link 93. An upper end 94 of the orientation link 93 is attached via fastening means 95 at an upper location 96 to each side of the forward wall structure 28. In a preferred embodiment the upper location 96 is attached to, or forms a part of, inner frame 32, thus facilitating pre-assembly. Thus, the forward wall structure 28, together with four fastening means 82, 85, 91, 95, pivot link 81, clamp link 90 and orientation link 93 forms a linkage 80 at left and right sides of the forward wall 28. When fastening means 82, 85, 91, 95 are loosened, linkage 80 provides freedom of movement of component links 81, 90, 93, enabling adjustments in position of the links relative to forward wall structure 28 and the vehicle load bed 11.

Multiple functions are accomplished with use of attaching linkage 80: with fastening means 82, 85, 91, 95 tightened to provide rigid joints, support is provided to control orientation of the forward wall 28 relative to the load bed 11, plus means are provided for adjusting longitudinal location of the lift-roof cover 10 on the load bed 11 and adjusting orientation of the forward wall 28 relative to load bed 11 to achieve effective sealing between the forward wall 28, lift-roof 22 and load bed 11 in a closed condition; means are also provided to complete installation or removal from the vehicle load bed 11 without need to fully remove attaching fastening means 82, 85, 91, 95; in conjunction with other components, means are provided to hold the forward wall 28 to a closed position relative to the lift-roof 22 with all components secured above a plane across lower edges 23 of the molded lift-roof 22, so that the lift-roof cover 10 may be shipped, handled and stored using the same methods employed for a conventional cap of the prior art.

Preferred fastening means 82, 85, 91, 95 for the attaching linkage 80 include friction lock-nuts 107, so that fastening means 82, 85, 91, 95 may be set with zero damp load and yet maintain reliable attachment (as needed to facilitate shipping). The friction lock-nuts 107 are used in combination with bolts 97 suitable for force-fitting to structural components so that tightening of fastening means 82, 85, 91, 95 is largely reduced to a one handed operation. Dimensions may be set so that, in event of looseness at one location, as due to error, linkage engagement is still retained with the load bed side wall flange 16. The lift-roof cover 10 is prepared for shipping with the forward wall 28 held to a closed position as described above. This is accomplished by installing the latch and strut pivot mount bracket sub-assemblies 76 to the lift-roof structure 22 with lift-assist struts 74 and strut lower pivot brackets 98 positioned along the rail 24, forward of the latch and strut pivot bracket 73 with the brackets 98 held in the linkage rear clamps 88, and with clamp links 90 and pivot links 81 in an upper, approximately horizontal position shown by the upper broken outline in FIG. 2.

Figure 8:
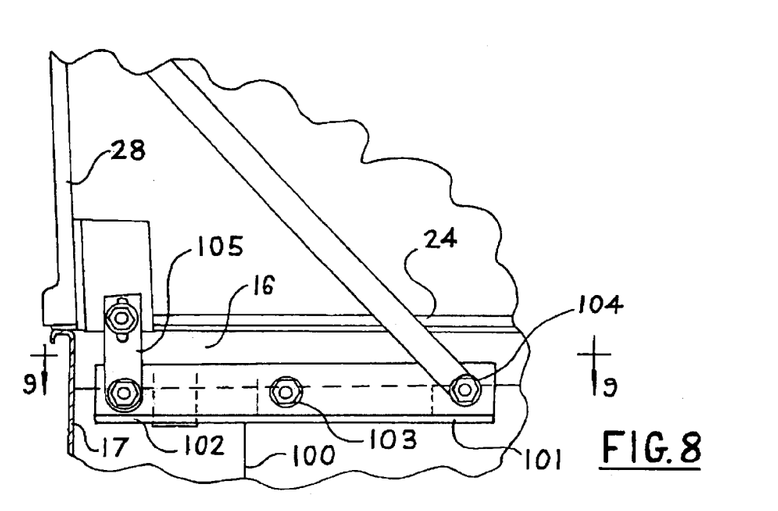
FIG. 8 is a fragmentary side elevation of an alternate forward wall attaching linkage means.
Figures 9, 10:
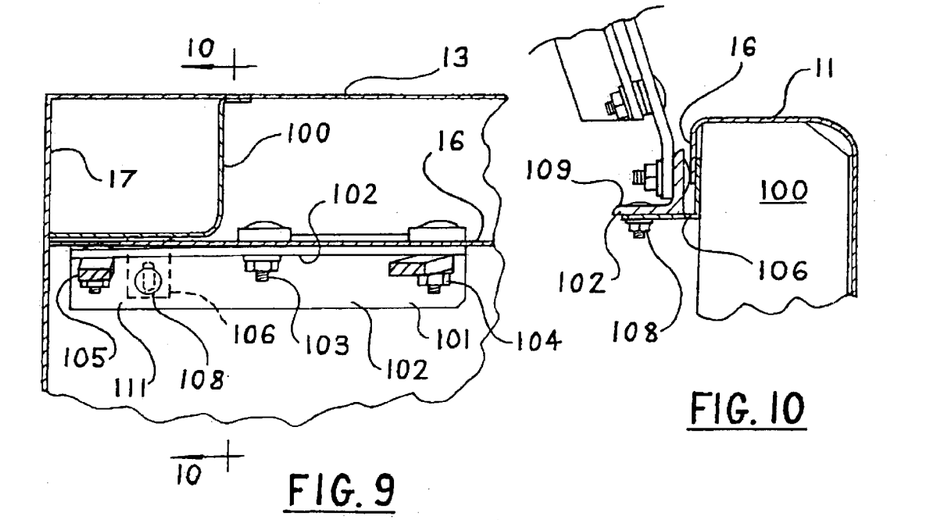
FIG. 9 is a fragmentary sectional plan view along arrows 9—9 of FIG. 8 of an alternate forward wall attaching linkage.
FIG. 10 is a fragmentary sectional view along arrows 10—10 of FIG. 9.

Referring to FIGS. 8, 9, and 10: Where access between the load bed side wall inner flange 16 and outer surface 13 is blocked or limited, as by load bed wall structure 100, toward the forward wall 17, a modified form 101 of the preferred linkage 80 may be employed. An extension member 102 of relatively rigid form such as having an angle cross section and of high strength material, may be attached under clamp fasteners 103, 104 inboard of the flange 16. The extension member 102 allows use of a forward clamp means 103 at a position where adequate access is available between the flange 16 and the side wall outer surface 13 rearward of attachment of the extension member 102 to pivot link 105. The desired lateral, vertical and longitudinal control of forward wall positioning on the load bed 11 is thereby provided. A retaining angle bracket 106 with adjustable means of attachment 108 to a horizontal face 109 on the extension member 102 may be used to engage the side wall flange 16 where clearance between the flange 16 and blocking structure 100 is limited. Where no clearance is available, adjustments may be made to ensure linkage contact is maintained at the forward end 111 with the flanges 16 at both sides of the load bed 11, so providing control of lateral positioning at the forward wall 28 relative to the load bed 11.

Referring to FIG. 1 and FIG. 2: Following installation of the latch and strut pivot bracket assemblies 76 to the rails 24 with the lift assist struts 74 lying forward along the rails 24, the forward wall 28, complete with attaching linkages 80 at each side, is installed and clamped into position in the same manner as for a conventional cap rear hatch 113 of similar construction. The forward wall 28 is then held to a closed orientation relative to the lift-roof structure 22 and the linkage rear clamp means 88 are clamped to the strut lower pivot brackets 98 to maintain the forward wall closed relationship to lift-roof 22. The forward wall lower members 48 are then checked and, if necessary, adjusted for relationship to the lift roof lower edges 23. Side retainer/forward stop means 54 are, at this stage, installed to the rails 24 at metal-to-metal interfacing component positions and should require no further adjustment when the lift-roof cover 10 is installed to a load bed 11.

Referring to FIGS. 1, 2, 13 and 14: Functional improvements also include rearward mounting of lift assist struts 74 between the vehicle load bed 11 and the lift-roof rails 24 in a manner facilitating full closure at the forward wall to lift-roof seal interface 34 when the lift-roof 22 is lowered by forcing the lift-roof 22 forward against the forward wall 28, and also adding lateral constraint in location of the lift-roof 22 relative to load bed 11. Geometry of the lift assist strut action is such that, with the lift-roof 22 in a lower, closed position, vertical loading of the lift-roof 22 on the lift assist struts 74 exceeds vertical force provided by the lift assist struts 74, so that the lift-roof 22 will remain in a lower, closed position unless manually raised. The lift assist struts 74 are located close to the rail inner edges 25 and the load bed flanges 16 so that, if the lift-roof structure 22 remained unlatched in error, the struts 74 constrain its lateral location. When the lift-roof structure 22 is raised above the fully lowered position, the forward force provided by the lift assist struts 74 pushes the lift-roof 22 against the forward wall structure 28 at the hinge interface 41. As the lift-roof 22 is lowered toward dosed, an increasing forward component of loading in the lift assist struts 74 causes an increase in forward deflection of the forward wall 28 at the hinge interface 41 relative to the forward wall lower edge 46 due to combined effect of flex in the forward wall structure 28 and flex in the load bed side walls 12 in the vicinity of the flanges 16 under tensile force transferred through orientation links 93, until a lift-roof position 114 (shown in broken line in FIG. 14) is reached where full closure has occurred at the forward wall to lift-roof seal interface 34. Due to the forward deflection of the forward wall 28 at the hinge interface 41, relative to the forward wall lower edge 46, position 114 occurs prior to full closure with the load bed 11, generally when the lift-roof 22 is at least a half inch clear of the load bed rear end 18.

Figure 11:
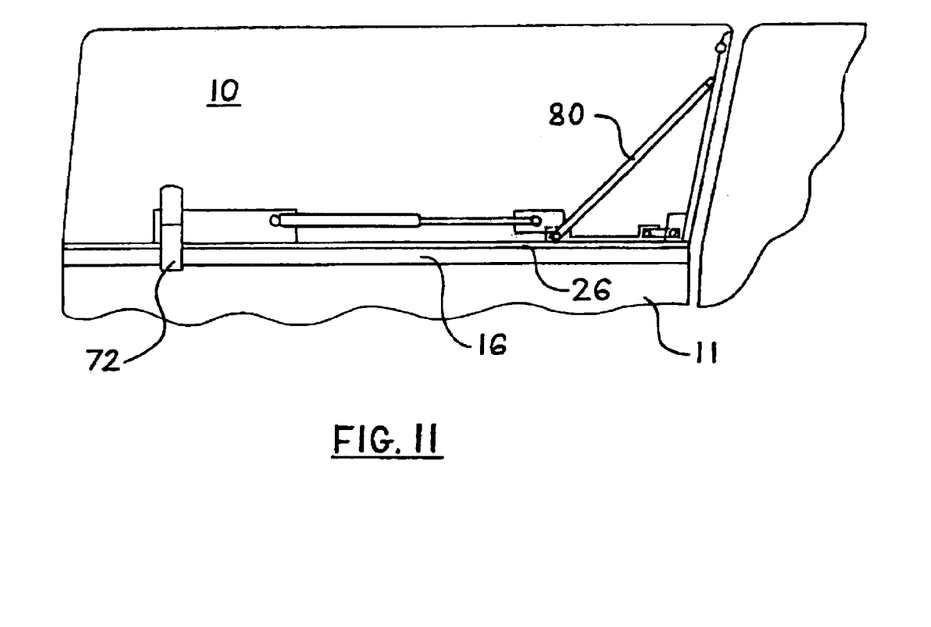
FIG. 11 is a sketch depicting the lift-roof cover as initially placed on a load bed with latches engaged to hold desired location.

Referring to FIG. 11: Installation is first a process of installing low friction/low stiction load bed interfacing seals 26 and positioning the lift-roof cover 10 on the load bed 11, in the same way as for conventional caps. After checking and, if necessary, adjusting function, the draw latches 72 are engaged with the flanges 16 to hold the lift-roof cover firmly in position.

Figure 12:
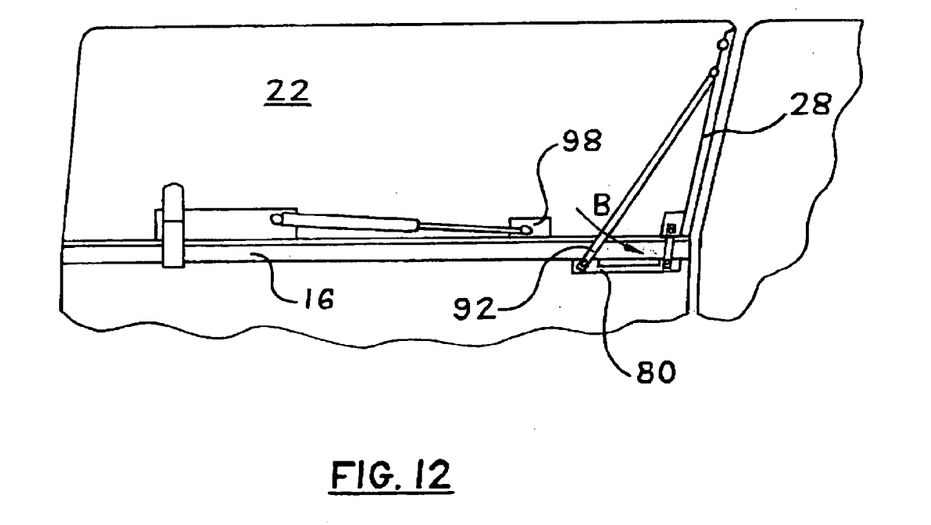
FIG. 12 is a sketch depicting the forward attaching linkage engaged with the load bed.

Referring to FIG. 12 and FIG. 2: The forward wall adjusting linkage rear clamp fasteners 91 are then loosened to release the strut lower pivot brackets 98, and the linkage 80 is rotated downward in direction of arrow B so that clamp means 86, 88 may be swung down clear of the load bed flange 16, then moved laterally inboard under the flange 16. The clamp link 89 is then swung upward in direction of arrow C to engage the flange 16. If necessary, orientation link lower end 92 is at this time adjusted to a position where the forward wall 28 is oriented with a closed relation to the lift-roof 22. Forward clamp means 86 is moved upward, as accommodated by slot adjusting means 84 of pivot link 81, so that flange 16 is engaged by forward clamp means 86. Clamp fasteners 85, 91 are then tightened to appropriate torque levels, followed by tightening of fasteners 82 and 95.

Figure 13:
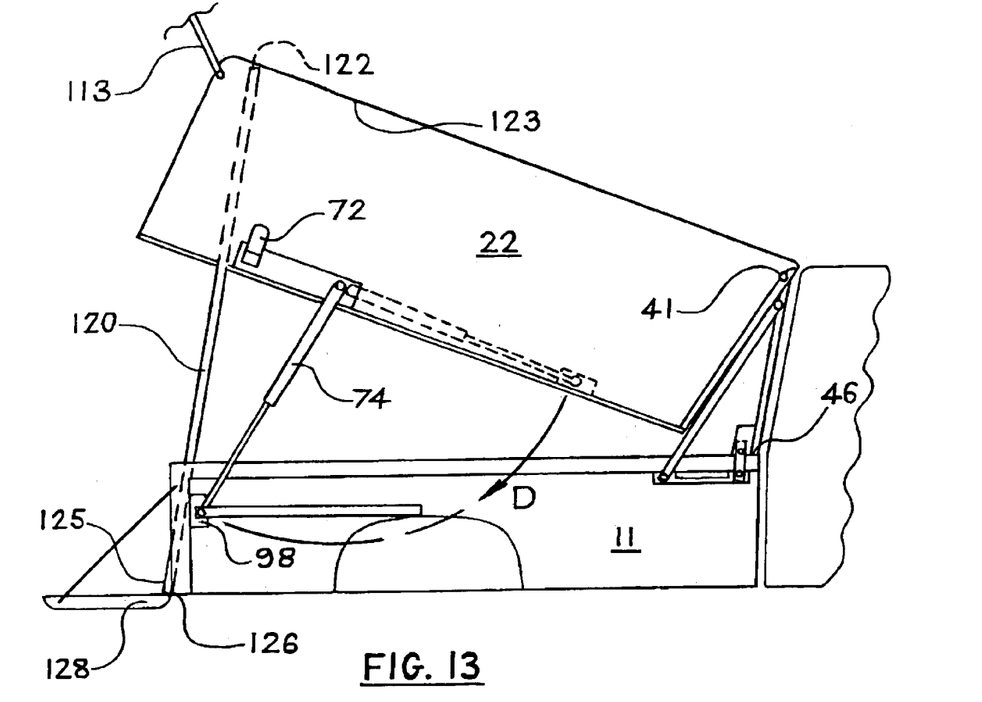
FIG. 13 is a sketch depicting the lift-roof raised for attachment of lift assist strut lower pivots
Figure 14:
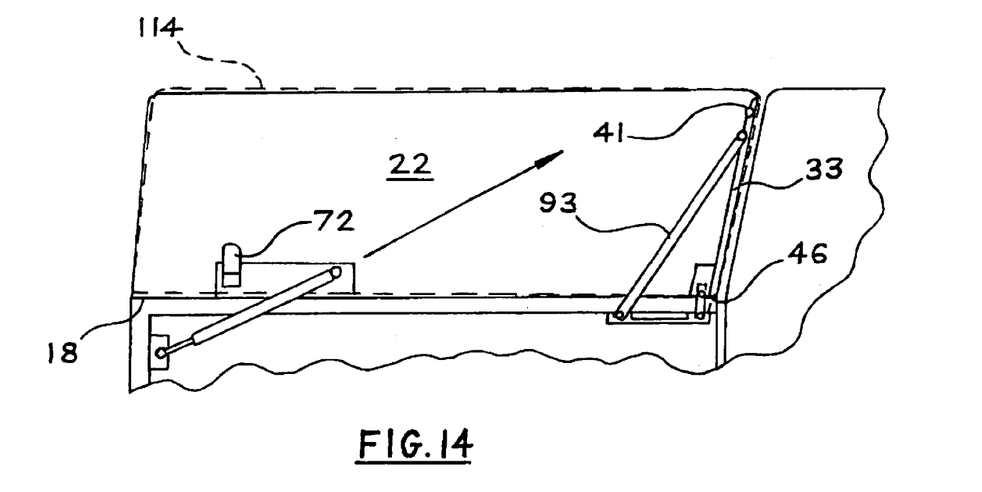
FIG. 14 is a sketch depicting the lift-roof lowered to levels at and near (broken line) full closure.

Referring to FIGS. 2, 13 and 14: The latches 72 are next released and a set height installation strut 120 is attached by temporary attachment means, (such as adhesive backed Velcro), 122 at one end to the lift roof structure ceiling 123 adjacent to the lift-roof rear hatch 113. The lift-roof structure 22 is then carefully raised until the installation strut lower end 125 falls forward to the rear edge 126 of the load bed 11 and is allowed to sit on the tailgate 128. Lift assist strut lower pivot bracket 98, having been released when forward adjusting linkage fasteners 91 were first loosened, may now be rotated in direction of arrow D to a location such as rear tie-down mountings where the lower pivot bracket 98 can be bolted to the load bed 11. (Referring now to FIGS. 2 and 14): After removing the set height installation strut 120 and lowering the lift-roof 22, operating relationships for lift-roof side retainer/stop units 54 are checked and latches 72 again engaged for closed mode operation.

Referring to FIGS. 1, 4, 5 and 6: Without countermeasures the lift-roof side wall forward lower edges 132 have increased potential for lateral vibration as compared with a conventional load bed cover, in which the side walls are integral to the forward wall. Such vibration is prevented cost effectively with stop and side wall retainer means 54 attached to the lift-roof 22 at left and right sides 20, 21. To accommodate variability in manufacture, stop and side wall retainer means 54 incorporate means for adjustment of lateral relative position 134.

Figure 7:
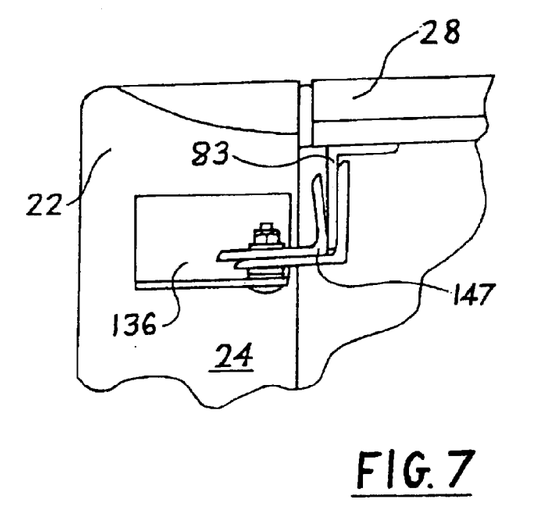
FIG. 7 is a fragmentary sectional view similar to FIG. 5 of an alternate side retention/stop means.

A preferred lift-roof adjustable side wall retainer and forward stop means 54 includes a first part or bracket 135 attached to a mount 136 attached to and/or forming a part of the lift-roof structure 22, the bracket 135 having a face 137 on a substantially vertical and longitudinal plane with a ramped leading edge 138 to guide engagement and prevent blocking due to minor misalignment of interfacing parts 135, 83, the face 137 being substantially coplanar with a mating face 139 on flange 83, attached to or forming a part of the forward wall 28. The bracket 135 and flange 83 each also have interfacing stop surfaces 140, 141 so that, as the lift-roof 22 is lowered to a closed condition, the stop surfaces 140, 141 make positive contact. The bracket 135 is attached to the mount 136 via fastening means 142, comprising a bolt 143 passing through slotted and/or oversize holes 134 in the mount 136 or bracket 135, the bolt 143 being retained by a friction lock-nut 145. The bolt is constrained from rotation by interference or force fitting to one part, while an adjustment slot is provided in the other, thus allowing the friction lock-nut 145 to be torqued to provide clamping, or loosening of the bracket 135 relative to the mount 136 using one hand and one tool. The use of slotted and/or oversize holes 134 accommodates relative lateral position adjustment between the first part 135 and the mount 136. By varying the thickness of spacing means 146 between the mount 136 and part 135, longitudinal position adjustment of the part 135 relative to the mount 136 may also be provided. With the lift-roof 22 in a closed, lower position, the bracket 135 is set to bear forward against flange 83 attached to or forming a part of forward wall structure 28. With the side retainer and closure stop adjustment means 54, closure of the lift-roof structure 22 relative to the forward wall 28 may be set during the manufacturing assembly process as needed to ensure satisfactory sealing between the lift-roof structure 22 and the forward wall 28 and also to ensure that the possibilities of vibration of lift-roof structure side walls 19 relative to the forward wall 28 or of unauthorized forced entry are eliminated. It will be recognized by one skilled in the art to which the invention pertains that with simple rearrangement of components, the various described functions may be reversed between components attached to the forward wall 28 and those attached to the lift-roof 22 without departing from the scope of the invention. (Referring to FIG. 7): It will be also be recognized that an alternate bracket 147 may be easily fabricated to capture flange 83 on both sides and by similar means vertical capture may also be achieved.

Figure 15:
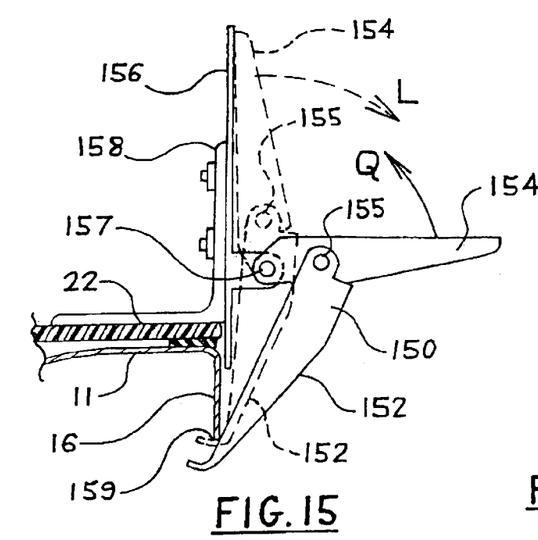
FIG. 15 is a fragmentary view looking forward of a first draw latch of the prior art mounted to the left side of a lift-roof structure. The fully latched condition is shown in broken line and an initial released condition is shown in solid line.
Figure 16:
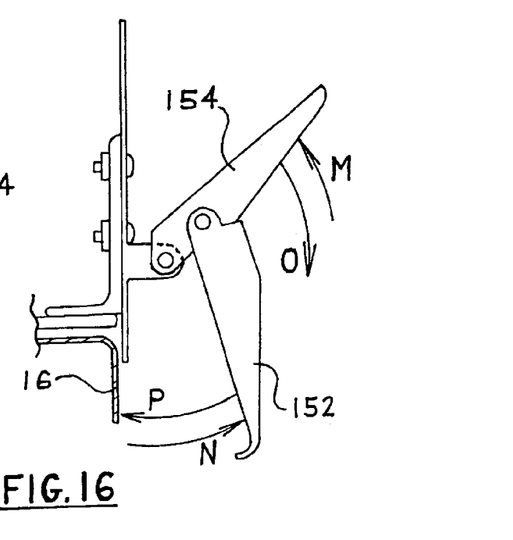
FIG. 16 is a view looking forward of a first draw latch of the prior art as in FIG. 15, showing a desired operating condition following release.

Referring to FIG. 15 and FIG. 16: Draw latches are used to draw and hold two structures together. The following describes limitations of two draw latches of the prior art and how they are improved to meet functional needs for lift-roof operation. A first over-center draw latch of the prior art 150 comprises a latch hook 152, a latch handle 154 and a latch base 156; the latch hook 152 being pivotally attached to the latch handle 154 at pivot means 155, the latch handle 154 being pivotally attached to the latch base 156 at pivot means 157. The latch base 156 is attached to a vertical surface 158 fixedly attached to, or forming part of, a first structure 22 and the latch hook 152 is used to engage a suitable engagement means 16 on the second structure 11. In latched condition (shown in broken outline in FIG. 15), tension force passing through the latch hook engagement point 159 with the second structure 11 and through the latch hook pivot 155, holds the latch hook 152 to the latched position until latch handle 154 is manually rotated away from the latch base 156 in direction of arrow L. Rotation of the handle 154 per arrow L away and down from the latch base 156 brings the tension force line "over center" across the latch handle pivot 157 toward a released condition (shown in solid line in FIG. 15), first lowering the latch hook 152 from engagement with the load bed flange 16. To complete full release (referring now to FIG. 16), with upward rotation of the latch handle 154 in direction of arrow M, the latch hook 152 should be moved clear of the load bed flange 16 per arrow N. In reverse, with the cap shell 22 in the lowered position, downward rotation of the latch handle 154 per arrow O first moves the latch hook 152 per arrow P against the flange 16. With relatively low rotational friction levels, the latch hook 152 can be conveniently held in the position shown in solid line in FIG. 15 using a thumb while, with the same hand, the handle 154 is rotated upward in direction of arrow Q, pulling the latch hook 152 into engagement with the load bed flange 16. As the handle 154 is rotated further upward, the structures 11, 22 are drawn and held to a latched condition.

The first draw latch of the prior art 150, as available, is built with axial clamp friction between components 152, 154, 156 at pivot interfaces 155, 157 so that, without force beyond gravity, components 152, 154 tend to remain in whatever relative position they are placed. However it has been found that initial operating efforts are too high for convenience and the friction declines with use to levels where, with weight of the latch handle 154 bearing against the latch hook 152, the latch hook 152 tends to fall under the flange 16 following initial disengagement, resulting in interference with the side walls 15 when lowering the lift-roof 22 from open, and/or re-engagement with the inner flange 16 when the lift-roof 22 is raised from closed.

Figure 17:
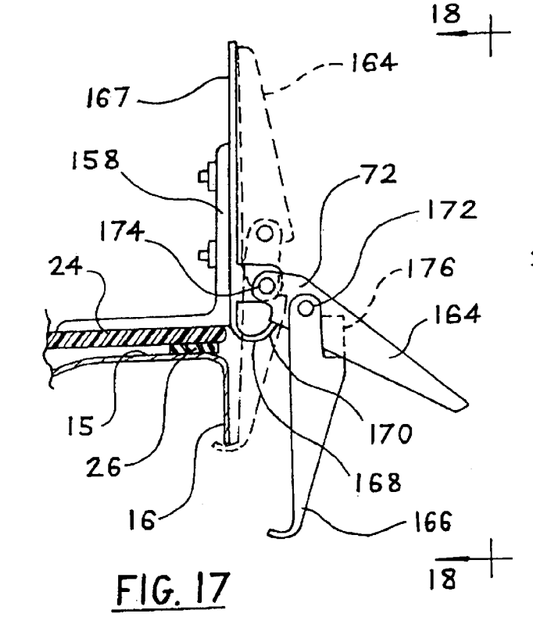
FIG. 17 is a fragmentary view looking forward of a first improved draw latch similar to the draw latch shown in FIGS. 17 and 18 except as described for use in a lift-roof cover, mounted to the left side of a lift-roof structure.
Figure 18:
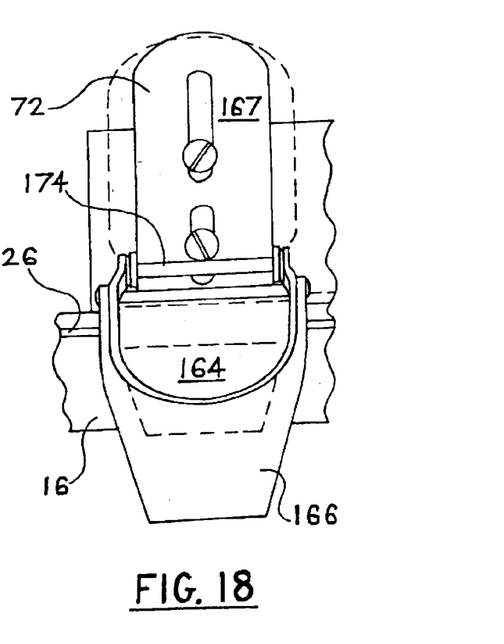
FIG. 18 is a fragmentary view along arrows 18—18 of FIG. 17.

Referring to FIGS. 1, 17 and 18: In a preferred embodiment, first alternate improved draw latches 72 are mounted to the rails 24 and have latch handles 164 which, when rotated to a fully latched/closed position, pull latch hooks 166 into engagement with the load bed inner flanges 16, thereby drawing the lift-roof 22 down to the load bed 11. With appropriate vertical adjustment, this causes compression of sealing means 26 between the rails 24 and load bed side wall upper surfaces 15 and prevents significant movement relative to the load bed 11. In the first improved draw latch 72 for use with a lift-roof cover, the latch handle 164, in rotating downward, is positively limited at a lower position where the latch hook 166 hangs clear of engagement or interference with the flange 16 when the lift-roof 22 is raised or lowered. The latch base 167 is mounted against a vertical surface 158 forming a part of, or attached to, lift-roof side wall rail 24, with the latch handle 164 pivoting from the latch base 167 and in a vertically upward orientation when in fully latched mode. As modified for the lift-cap application, the latch base 167 is formed at a lower end 168 to create a positive stop 170 for the latch handle 164 at a position where said latch handle is oriented down from its near vertical latched position and the latch hook pivot 172 is substantially inboard of the latch handle pivot 174, following release of the latch hook 166 from the load bed flange 16. The first improved draw latch 72 is substantially free of rotational friction drag at the latch hook pivot attachment 172 and the latch hook 166 is modified from the first draw latch of the prior art 150 as by removal of material 176 so that, when the handle 164 is rotated downward against the stop 170, the latch hook 166 can hang freely and remain clear of the load bed wall upper surface 15. This allows the lift-roof structure 22 to be freely lowered toward a closed position before, with easy one-handed operation, moving and holding the latch hook 166 under the flange 16, while rotating the handle 164 toward vertical to engage the latch hook 166 with the flange 16 and pull the lift-roof structure 22 to a fully latched position.

Figures 19, 20, 21:
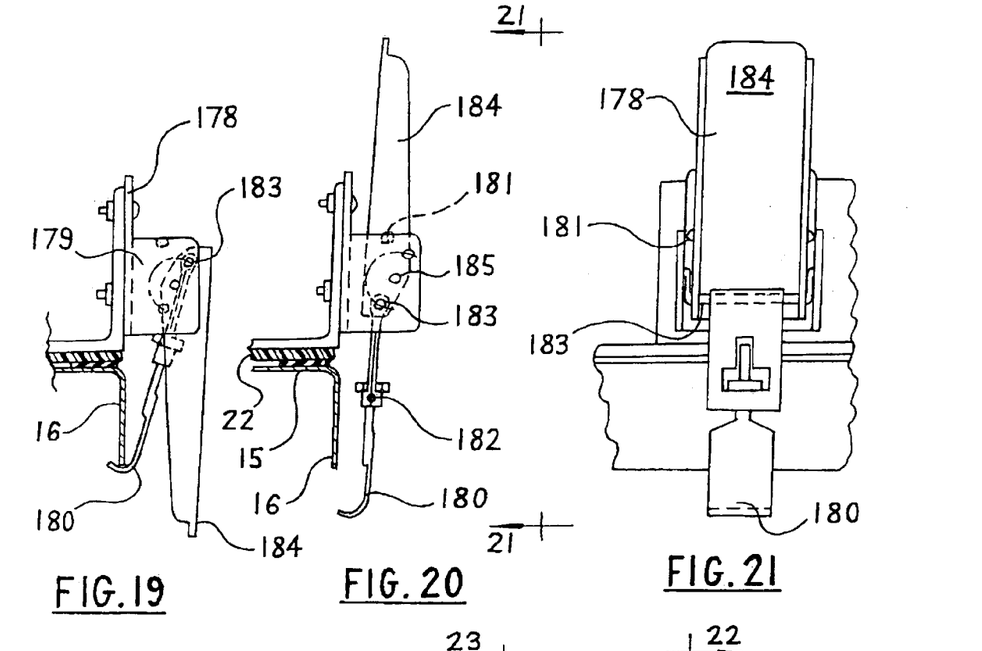
FIG. 19 is a fragmentary view looking forward of a second draw latch of the prior art mounted to the left side of a lift-roof structure, in a latched condition.
FIG. 20 is a fragmentary view looking forward of a second draw latch of the prior art mounted to the left side of a lift-roof structure, in a released condition.
FIG. 21 is a fragmentary view along arrows 21—21 of FIG. 20 of a second draw latch of the prior art mounted to the left side of a lift-roof structure, in a released condition.

Referring to FIGS. 19, 20 and 21: A second over-center draw latch of the prior art 178 includes a base 179, a latch handle 184 pivotally attached to the base 179 at a pivot 185, and a latch hook 180 pivotally attached to the handle 184 at a hook pivot 183. Retention means 181 temporarily retain the latch handle 184 in an upward vertical orientation with the hook pivot 183 in a lower released position (shown in FIG. 20). However, the latch hook 180, following disengagement, remains in a position determined by relation of its center of gravity 182 to its pivot 183, about which it freely rotates. This position may be such as either to interfere with the load bed wall upper surface 15 when the lift roof 22 is lowered and re-engage the load box inside flange 16 when it is raised, or otherwise to fall clear and remain clear of the flange 16 when engagement is desired. The relation of the latch hook 180 to the latch handle 184 is such that its position cannot easily be controlled while also operating the handle 184 with the same hand.

Figure 22:
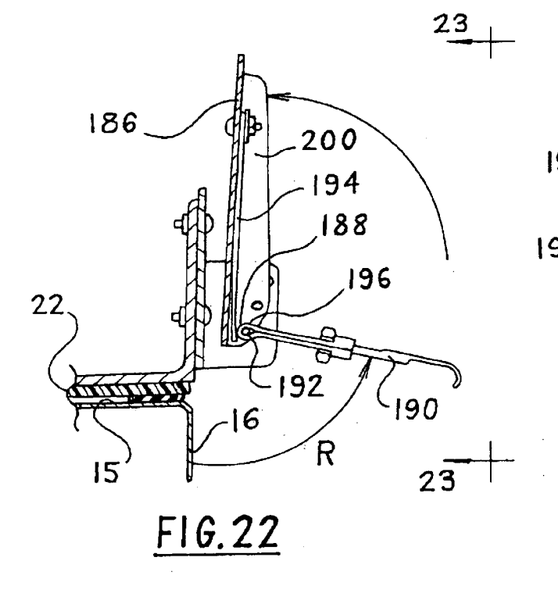
FIG. 22 is a fragmentary sectional view along arrows 22—22 of FIG. 23 of a second improved draw latch similar to the draw latch shown in FIGS. 19, 20 and 21 except as described, for use in a lift-roof cover, mounted to the left side of a lift-roof structure.
Figure 23:
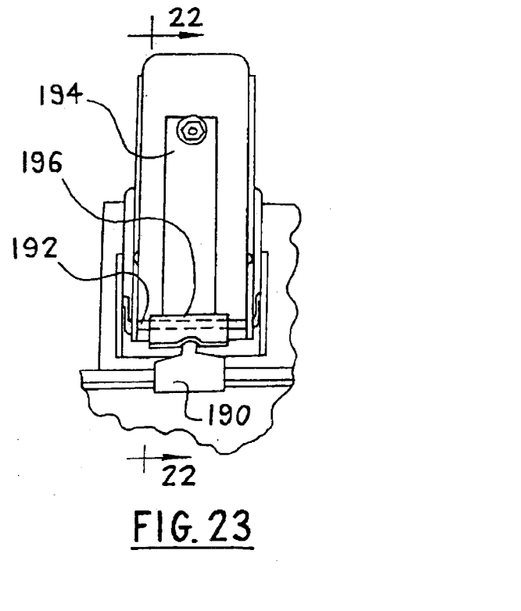
FIG. 23 is a fragmentary view along arrows 23—23 of FIG. 22 of a second improved draw latch for use in a lift-roof cover, mounted to the left side of a lift-roof structure.

Referring to FIG. 22 and FIG. 23: In a second alternate improved latching means 186 suitable for lift-roof cover application, the addition of reliable friction means 188 acting relative to rotation of the latch hook 190 about its pivot 192 facilitates operation of the latching function as a one-handed operation, allowing simultaneous latching at left and right sides 20, 21 when the lift roof cover 10 is closed. Reliable rotational friction drag is provided by use of leaf spring 194 bearing against a circumferential surface 196 of the latch hook 190 where the circumferential surface 196 wraps around the pivot pin 192. It will be recognized by one skilled in the art to which the invention pertains that wear in the friction interface 188 between the leaf spring means 194 and the latch hook circumferential surface 196 will not quickly change normal force at the friction interface 188. This is because, unlike friction methods commonly employed in over-center draw latches of the prior art, friction drag is controlled by spring deflection, which will be large relative to any change in deflection resulting from wear. Therefore, friction drag can be expected to be adequately maintained over a lift-roof cover functional lifetime. When the latch handle 200 is raised, the latch hook 190 is first lowered and, as the hook 190 clears the flange 16, added friction drag exceeding the effect of gravitational force, which gravitational force otherwise causes the latch hook 190 to hang substantially vertically below hook pivot 192, causes the latch hook 190 to be rotated inboard and upward with latch handle 200 in direction of arrow R. This ensures that, with the latch handle 200 retained to an upward vertical orientation, the latch hook 190 will not re-engage the flange 16 when the lift-roof 22 is raised to an open position, nor interfere with the load bed side wall upper surface 15 when the lift-roof 22 is lowered. Also, from this position, with the lift-roof 22 in a lowered position, if the latch hook 190 is first independently manually rotated substantially downward from its resulting position relative to the handle 200 following release, the added friction ensures that the latch hook 190 will move against, and be held against, the load bed inside flange 16 until the latch hook 190 has fully engaged, when the latch handle 200 is then fully rotated downward to draw the latch hook 190 upward.

The improvements of the present invention relating to a load bed lift-roof cover are defined by the following claims:

What is claimed is:

1. A load bed lift-roof cover including pivotal attachment of a lift-roof to a forward wall, the forward wall comprising substantially a hatch door including a window mounted in an inner frame of generally inverted U-shape, the window being retained within the inner frame by a lateral closure member joining sides of the inner frame;

the inner frame being pivotally attached across a lateral edge to an outer frame of matching inverted U shape by hinge means comprising telescopically assembled interlocking male and female hinge halves projecting from the inner and outer frames;

the outer frame being attached to the lift-roof at a forward opening in the lift-roof.

* * * * *